INVENTOR.
Preston J. Heinle
Karel J. Brouwers
BY
Mueller & Aichele
ATTY'S.

3,813,379
THERMALLY STABILIZED THERMOSETTING PLASTIC MATERIAL, AND ARTICLE
Karel J. Brouwers, La Mesa, and Preston J. Heinle, Phoenix, Ariz., assignors to Motorola Inc., Franklin Park, Ill.
Original application Dec. 14, 1970, Ser. No. 97,914. Divided and this application July 20, 1972, Ser. No. 273,358
Int. Cl. C08g 51/52
U.S. Cl. 260—28
7 Claims

ABSTRACT OF THE DISCLOSURE

Molding materials of the thermosetting type containing halogenated compounds for flame retarding are stabilized against high temperature decomposition by the addition of a stabilizing system of a thioester and an antioxidant. Such stabilized materials are used in encapsulating semiconductive elements in forming improved semiconductor devices.

---

This is a division of application Ser. No. 97,914, filed Dec. 14, 1970, now abandoned.

BACKGROUND OF THE INVENTION

This invention relates to methods for stabilizing thermosetting materials against thermal decomposition and to the resulting thermally stabilized materials, more particularly, it relates to methods for stabilizing thermosetting materials containing halogenated compounds for fire retardance against thermal decomposition and the resulting thermally stabilized materials and finished molded products and it is an object of the invention to provide improved methods and improved materials and products of the indicated nature.

The plastic encapsulation of semiconductor elements including discrete devices such as transistors, for example, and integrated circuit devices is well known. Such encapsulation is carried out in well known molding apparatus using well known thermosetting molding materials of the phenolic, epoxy and silicone types, for example. The patents—No. 3,367,025 Doyle, No. 3,413,-713 Helda et al., and No. 3,444,440 Bell et al., all assigned to the same assignee as the present invention—utilize such well known apparatus, methods and materials.

Some of the well known thermosetting molding materials or formulations, while having good electrical properties and moisture resistance in the finished product, are still expensive. The molding operation using such well known formulations is relatively inefficient in that the molding times may be long. Moreover some of the resulting devices are relatively weak physically whereby the rate of breakage is high during assembling of the devices with other components or other handling.

Accordingly, it is a further object of the invention to provide an improved thermosetting molding material which eliminates the deficiencies of the prior art.

It is a further object of the invention to provide such an improved thermosetting molding material which, in the finished product, has good electrical properties, is fire retardant, moisture resistant, physically strong and thermally stable.

It is a further object of the invention to provide an improved encapsulated semiconductor device wherein the encasement, or encapsulation, comprises a fire retardant, thermally stable thermosetting material.

It is a further object of the invention to provide an improved thermosetting, fire retardant, thermally stable molding material for semiconductor devices which is reduced in cost, efficient in use and is productive of substantial decreases in molding time.

SUMMARY OF THE INVENTION

In carrying out the invention in one form there is provided a method of making an encapsulated semiconductor device which comprises, in combination, the steps of providing a semiconductor element having leads extending therefrom, and encasing said semiconductor element in a thermally stabilized, flame retardant thermosetting plastic molding compound.

In carrying out the invention according to another form, there is provided a method of making an encapsulated semiconductor device which comprises, in combination, the steps of providing a semiconductor element having leads extending therefrom, and encasing said semiconductor element in a halogenated compound containing thermally stabilized thermosetting plastic molding compound.

In carrying out the invention in still another form, there is provided an improved method for thermally stabilizing thermosetting plastic molding formulations containing halogens.

In carrying out the invention in a still further form, there is provided an improved method for thermally stabilizing a system of epoxy resins, phenolic resins, and a chlorinated compound by the addition of a stabilizing system of a thioester and a sterically hindered phenol.

DESCRIPTION OF THE PREFERRED EMBODIMENT

Figure 1:
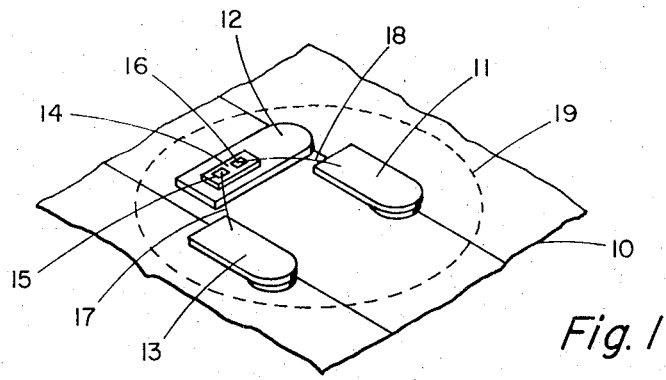
FIG. 1 is a diagrammatic fragmentary perspective view of a device according to the invention.
Figure 2:
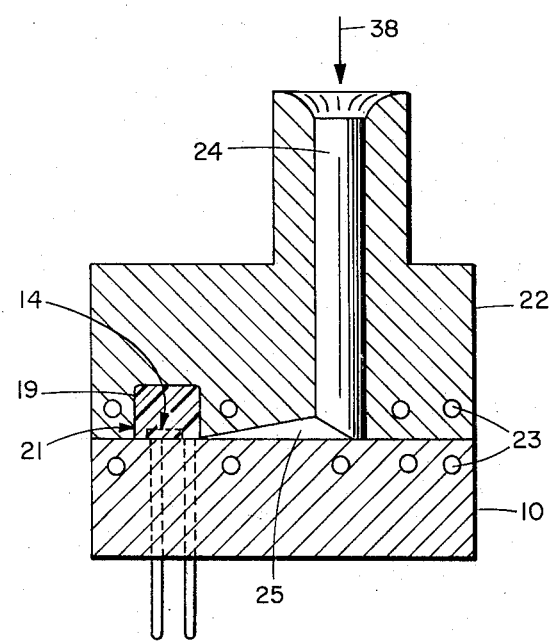
FIG. 2 is a sectional view on a smaller scale of molding apparatus and a device according to the invention.

A molding material or formulation according to the invention is used in well known transfer molding apparatus to form an improved semiconductor device, such as a transistor, the molding apparatus and the transistor being shown diagrammatically in FIGS. 1 and 2. In FIG. 1, the bottom portion 10 of a mold is shown holding the flattened ends 11, 12 and 13 of three leads of a transistor. The flattened end 12 has a chip 14 comprising the semiconductor portion of the transistor bonded to it. Typically, the flattened end 12 may be bonded to the collector of the transistor. The emitter 15 and the base 16 may be wire bonded by fine wires, 17 and 18 to the flattened ends 12 and 13, respectively. The dotted outline 19 represents the plastic encapsulation which surrounds the completed transistor 21 as may be visualized in FIG. 2.

In FIG. 2 the mold is shown as comprising the bottom portion 10 and a top portion 22 in the closed position following the molding step utilizing molding material according to the invention. Thus the chip 14, the flattened ends 12, 13 and 14 of the leads and the connecting wires 17 and 18 are all encased by the cured molding material 19. The mold portions 10 and 22 may be heated to a desired temperature by heating means 23 such as steam passages, electrical resistors or other. The molding material is forced from the transfer pot 24 in mold part 22 and through a runner and gate 25 to the cavity containing the chip 14. After the molding operation is completed, the mold parts 10 and 22 separate and the finished transistor is removed as is well understood.

While a transistor is shown and referred to, this is exemplary only, and other semiconductive elements may be encased to form new articles. For example, without limiting the scope of the invention, diodes, integrated circuits of all types, thyristors, etc., may be formed in the same manner.

The mold shown is diagrammatic only and any well known molds may be used.

Figure 3:
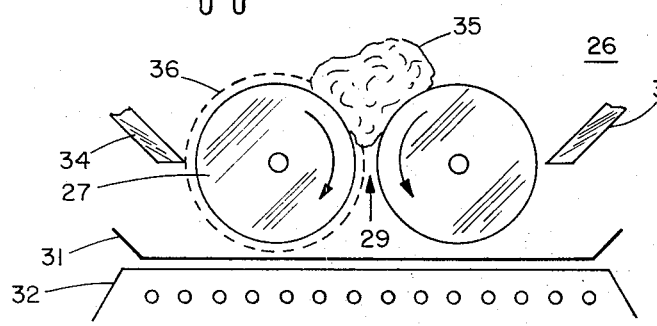
FIG. 3 is a diagrammatic view of mixing or processing apparatus used in making formulations according to the invention.

Apparatus for mixing the ingredients of the material according to the invention, at one stage, may be of a well known form and is shown diagrammatically in FIG. 3 as a mill 26 comprising the counter rotating metal rollers 27 and 28 disposed with a narrow gap 29 between them. At one stage of the mixing, gap 29 may have a width of about 100 thousandths of an inch. Below the rollers is a tray 31, or other container, for receiving the molding material after milling. Below tray 31 is the bed 32 of the milling machine which is cooled, for example, as by pipes 33 containing cold water. Thus the molding material falling onto a tray 31, after being removed from roller 27 by doctor blade 34, can be rapidly cooled to room temperature or below to arrest any chemical reaction which is still going on. Typically, the polymerization, or other chemical reaction, is completed during the subsequent molding operation.

The roller 27 is heated to a desired higher temperature, while the roller 28 is maintained at a cooler, for example, room temperature, and molding material 35, in a preliminary form, is disposed above the rollers for the mixing and partial curing, or polymerization, step. The material adheres to the heated roller 27 forming a layer shown by the dotted line 36 which is cut off, when desired, by the doctor blade 34. Roller 28, being maintained cool, does not have any material adhering to it when the process is functioning properly. But a doctor blade 37 is provided for removing any material adhering to roller 28 for any reason including maladjustments during start up, or other, conditions. Cut off material falling on tray 31, after cooling, is granulated in any manner, as by a grinder, for subsequent use in a molding operation.

Molding material, formulation or compound, according to the invention, when molded or formed around a semiconductive element, or any other element, i.e., encapsulating it, must impart to the finished product the improved properties of good electrical characteristics, physical strength, moisture resistance or hermeticity, flame retardance and, most of all, thermal stability. In addition the material according to the invention must be economical and efficient in giving reduced total costs and rapid molding.

One example of a material according to the invention has the following ingredients by description, amount in grams for one particular batch size and percentage of the total weight:

| Description | Weight in grams | Percentage of total weight |
| --- | --- | --- |
| 1. Liquid epoxy resin (cycloaliphatic) epoxy equivalent weight of approximately 140, 3,4-epoxycyclohexyl-(3,4-epoxy) cyclohexane carboxylate | 218.5 | 8.66 |
| 2. Phenolic novolak resin | 218.5 | 8.66 |
| 3. Epoxidized cresol novolak resin, epoxy equivalent weight of approximately 225 | 437.0 | 17.33 |
| 4. Silica or mineral filler | 1,310.0 | 51.95 |
| 5. Lubricant montan wax | 25.0 | 1.03 |
| 6. Silicone resin (Dow Corning R-5581) | 40.0 | 1.59 |
| 7. Silane filter treatment, beta (3,4-epoxycyclohexyl) ethyltrimethoxysilane | 4.5 | 0.18 |
| 8. Black pigment carbon black | 4.8 | 0.19 |
| 9. Antimony oxide | 30.0 | 1.19 |
| 10. Chlorendic anhydride, 4,5,6,7,7-hexachlorobicyclo(2,2,1)-5-heptene-2,3-dicarboxylic anhydride | 200.0 | 7.93 |
| 11. Accelerator stannous octoate | 2.5 | 0.10 |
| 12. Thioester dilauryl thiodipropionate | 10.0 | 0.40 |
| 13. Antioxidant octadecyl 3-(3',5'-di-tert-butyl-4'-hydroxyphenyl) propionate | 20.0 | 0.79 |
| Total | 2,520.8 | 100 |

In this example the liquid epoxy resin and the phenolic novolak resin are heated in separate containers to approximately 175 degrees C., or until all of the phenolic resin has melted, mixed together and stirred for about three minutes. The time of stirring, that is the time of reacting these ingredients, or polymerization, at this stage, is determined by the melting point of the resulting solid which is desired to be about 46 degrees C. The stirring may continue for a lesser or greater time, for example, 2½ to 10 minutes to achieve this melting point or some other melting point as the particular conditions or desired results may indicate. After the appropriate mixing of these two ingredients, the resulting material is rapidly cooled to room temperature or below such as by surrounding the container with cold water or ice to retard the reaction and to maintain it effectively stopped. This substance is an intermediate product. It is desired that the final reaction, polymerization or cross-linking including that of the remaining ingredients take place subsequently in mixing, and in the mold during the molding operation. After the cooling of the said reacted epoxy and phenolic resins, the resulting solid is pulverized or granulated to a size as desired.

The partially reacted pulverized solid of epoxy and phenolic resins is now mixed with the remaining dry ingredients of epoxidized cresol novolak resin, silica or mineral filler, lubricant, silicone resin, pigment, antimony oxide, chlorendic anhydride, thioester and antioxidant. The accelerator stannous octoate and the silane filler treatment are liquids and are added as such. The mass of the resulting ingredients is a dry powder or granulated material which is poured atop the rollers 27 and 28 of FIG. 3 and is shown as the mass 35 between these two rollers.

Rollers 27 and 28 are part of a mill for mixing the ingredients, bringing them up to proper temperature and causing further reaction or polymerization to take place. The rollers 27 and 28 are counter rotating, as shown, and each has a diameter of about 8 inches, for example. The gap or spacing, 29 between the two rollers is about 100 mils. Roller 35 rotates at a peripheral speed of about 32 feet per minute, whereas roller 28 rotates at a peripheral speed of about 25½ feet per minute. Roller 27 is maintained at a temperature of about 82° C. by any appropriate heating means and the roller 28 is maintained at a temperature of about 27° C. by any suitable means such as by the respective circulation of hot and cold liquids therethrough.

The mass 35 of the mixed ingredients weighing about 2,520.8 grams, or about 5.6 lbs., is mixed by being squeezed into the gap 29. The rollers rotating at different peripheral speeds develop a shear stress in the mass of material thereby facilitating the mixing operation. The melting point of the mass 35 being about 46° C. begins to melt when in contact with the roller 27 at a temperature of 82° C. The heated material clings to the roller 27 and is thereby carried around and remixed with the remaining mass 35 whereas no material, ordinarily, adheres to the roller 28. The mixing and fluxing process is continued until all of the mass 35 is melted or fluxed. After all of the material is fluxed the peripheral speed of roller 27 is increased to about 70 feet per minute and the peripheral speed of roller 28 is increased to about 56 feet per minute. The mixing or milling process is continued until an appropriate reaction state of the mixed material is reached. This is within the skill of the operator and may be further determined by cutting off a piece of the material, as by the doctor blade 34, cooling it, and testing it in a molding operation. The criterion of proper mixing and reacting at this stage is that of proper or suitable moldability. If the material is overreacted, that is mixed for too long a period of time, the cure time of the resulting material in the mold will be too short and the material tends not to fill the mold. On the other hand, if the mixing process has been too short, that is the material has been underreacted, then the curing time in the mold will be too long and the process is inefficient. The molding compound is considered best when the molding operation is completed, that is final proper curing takes place in the mold in one minute or less.

After applying this criterion, and it has been determined that the material has been mixed and/or reacted a sufficient amount of time, the gap 29 may be increased to about 125 mils and the doctor blade 34 applied to cut off the layer of material which has been formed on roller 27, as shown by dotted line 36. The tray 31 may be moved in one direction, or the other, to receive the layer of material 36 as it comes off of the roller. The dimension of gap 29 may be selected in order that a full circumferential length of material 35 may be received in one length of the tray 31. The bed of the mill 32 may have cooling water flowing through the pipes shown therein in order to maintain the temperature of tray 31 at a low value, thereby retarding the reaction, or curing, of the material as it comes off of roller 27.

After the material 36 has been properly cooled it is a solid and may be granulated or ground into a powder in any suitable mill for the subsequent molding operation.

After the molding material has been formed as described it is ready for the molding operation. Referring to FIGS. 1 and 2, a transistor 14, for example, has been bonded to flattened end 12 of one of the leads and the other flattened ends 11 and 13 of the leads are properly disposed in the mold. The upper part 22 of the mold is closed upon the lower part 10 and a charge or fixed amount of molding material, made as described, is disposed in the passageway 24 and a ram, indicated diagrammatically by the arrow 38, comes down and forces the molding material into the cavity where the transistor chip is disposed. The mold parts 10 and 22 are maintained at a temperature of about 190° C. and the pressure exerted by the ram is about 1000 lbs. per square inch. Under these conditions the molding compound turns essentially into a liquid and flows into the mold cavity, completely surrounding the transistor 14 and the flattened ends of the leads 11, 12 and 13 to give the completed molded article 19. The molding operation from the time of actuation of the ram 38 until the encapsulated article 19 is removed may be no greater than one minute and preferably should be substantially less according to the invention.

The mold temperature of 190° C. preferably should be maintained within about ±3°.

In the initial mixing operation of the liquid epoxy resin and the phenolic resin, as well as in the milling operation, a time temperature factor has to be observed in order that the polymerization reactions taking place in these preliminary steps do not go too far. In the final molding process there is also a time temperature factor. All of these factors have been selected whereby the mold temperature of about 190° C. and a time of less than one minute completes the polymerization of the materials, that is the reaction thereof, in order to give a device or product which is sufficiently robust that it can be removed from the mold without damage. Postcuring in an oven at an elevated temperature for an appropriate length of time, for example at 175° C. for 16 hours, essentially completes the polymerization or cross-linking reaction to yield the final product which is resistant to moisture, has good electrical properties, is physically strong, flame retardant and termally stable and is economical to manufacture.

The addition of the epoxidized cresol novolak resin is needed to form a better molding compound; the silica or mineral filler is used to add bulk and strength to the molding material and reduce its cost; the lubricant, montan wax, for example, is added as a mold separating compound, in order that the molded article comes easily out of the mold cavity; the silicone resin is added to enhance hermeticity or water resistant properties; the silane filler treatment material is added as a coupling compound to couple the filler material to the resin system; the pigment, which may be black pigment, for example carbon black, is added to produce some attractive color; the antimony oxide and the chlorendic anhydride are added to produce the fire or flame retardant characteristics in the final article; and the stannous octoate is added as an accelerator in order to promote the reaction taking place.

The chlorendic anhydride serves a double purpose; by virtue of its reactive anhydride function, it serves as a curing agent for the resin system while it chlorine content, working with the antimony oxide confers desired flame retardant characteristics upon the resulting material. Flame retardance results from the reactions between the halogen-containing material and antimony compounds at elevated temperatures to form antimony oxyhalides and other by-products. The reactions yielding the antimony oxyhalides are endothermic and serve to cool the plastic body, thereby tending to extinguish fire. The antimony oxyhalide, being gaseous, tends to blanket the plastic material and exclude oxygen, thereby providing further flame retardance.

In substances, that is molding materials, where waterproofing properties are not necessary the silicone resin may be eliminated. Where colors other than black are desired, pigments other than carbon black may be used. If the natural color of the substances is suitable all pigments may be eliminated. Similarly, under appropriate circumstances the silica filler, the silane filler treatment, and the lubricant may be eliminated. The accelerator, stannous octoate, may be eliminated where molding times and curing times otherwise are sufficiently short. In any event, the antimony oxide and chlorendic anhydride which give the fire retardance are necessary and the stabilizers, the thioester and the antioxidant are necessary to stabilize the substances, that is the molding material against thermal decomposition at elevated temperatures.

The decomposition of the chlorendic anhydride takes place at temperatures in the vicinity of 160–200° C. In this decomposition chlorides are released which attack the leads and metallic portions of the semiconductor to which the leads connect thereby producing deterioration when semiconductor products are stored, or used, at elevated temperatures, for example, at 200° C. for periods greater than 200 hours. Such decomposition is evidenced by discoloration of the leads, for example. In testing devices molded from materials in which the thioester and the antioxidant ingredients were eliminated, it was evidenced that the decomposition which was taking place in relation to the chlorendic anhydride was thermal decomposition rather than oxidation. This was determined by observations which showed that decomposition occurred in the interior of the device where no oxygen was present. The combination of the thioester, dilauryl thiodipropionate, and the antioxidant, octadecyl 3-(3′,5′-di-tert-butyl-4′-hydroxyphenyl) propionate, is an oxidative stabilizer.

Even though the decomposition was not oxidation, it was discovered that the chlorendic anhydride could be stabilized by the use of an oxidative stabilizer, octadecyl 3-(3′,5′-di-tert-butyl-4′-hydroxyphenyl) propionate acting with the thioester, dilauryl thiodipropionate.

The antioxidant is a compound of the class known as sterically hindered phenols and it is believed that other sterically hindered phenols would function adequately such, for example, as tetrakis [methylene 3-(3′,5′-di-t-butyl-4′-hydroxyphenyl) propionate] methane. Other thioesters than dilauryl thiodipropionate are believed will function properly in the system described such, for example, as distearylthiodipropionate and dimyristylthiodipropionate.

Actual tests of transistors formed using the formulation according to the invention and using formulations excluding the thioester and the antioxidant showed that transistors according to the invention would, after a high temperature (175° C.) reverse bias test of over 200 hours, show a retention of beta of the transistor in the vicinity of 75% whereas the transistors formed without the stabilizing compounds had a beta retention of about 10%. Similarly the average $I_{CBO}$ of transitsors according to the invention would be in the vicinity of 292 picoamperes whereas the average $I_{CBO}$ of transistors made with molding compounds not stabilized would have an $I_{CBO}$ of over 1 microampere measured at the same voltage.

A second example of a material according to the invention has the following ingredients by description, amount in grams, and percentage of the total weight.

| Description | Weight in grams | Percentage of total weight |
|---|---|---|
| 1. Liquid epoxy resin (cycloaliphatic) epoxy equivalent weight of approximately 140, 3,4-epoxycyclohexyl (3,4-epoxy) cyclohexane carboxylate | 189.2 | 7.50 |
| 2. Phenolic novolak resin | 189.2 | 7.50 |
| 3. Anhydride hardener hexahydrophthalic anhydride | 170.6 | 6.77 |
| 4. Chlorinated plasticizer chlorinated biphenyl 68% chlorine | 85.0 | 3.37 |
| 5. Epoxidized cresol novolak resin, epoxy equivalent weight of approximately 225 | 437.0 | 17.33 |
| 6. Silicone resin (Dow Corning R-5581) | 40.0 | 1.59 |
| 7. Amine catalyst hexamethylene tetramine | 8.0 | 0.32 |
| 8. Accelerator stannous octoate | 2.5 | 0.10 |
| 9. Accelerator 2 ethyl, 4 methyl imidazole | 2.5 | 0.10 |
| 10. Silica or mineral filler | 1,220.0 | 48.37 |
| 11. Lubricant montan wax | 13.0 | 0.52 |
| 12. Black pigment carbon black | 10.0 | 0.40 |
| 13. Silane filler treatment beta (3,4-epoxycyclohexyl) ethyltrimethoxysilane | 4.5 | 0.18 |
| 14. Antimony oxide | 120.0 | 4.76 |
| 15. Thioester dilauryl thiodipropionate | 10.0 | 0.40 |
| 16. Antioxidant octadecyl 3-(3',5'-di-tert-butyl-4'-hydroxyphenyl) propionate | 20.0 | 0.79 |
| Total | 2,521.5 | 100.00 |

In this second example, the liquid epoxy resin, the chlorinated plasticizer, the phenolic novolak resin, and the anhydride hardener are each heated separately to approximately 150° C.

When all of the phenolic novolak resin is melted, these four ingredients are mixed together and stirred for approximately five minutes. The time of stirring, that is the time of reacting these ingredients, or polymerization, is determined by the melting point of the resulting solid which in this example is 40° to 50° centigrade. The stirring may continue for a lesser or greater length of time to achieve the desired melting point as the particular conditions or desired results may indicate. After the appropriate mixing, the resulting material is rapidly cooled to room temperature or below such as by surrounding the container with cold water or ice to retard the reaction and to essentially maintain it stopped. The substance is an intermediate product. It is desired that the final reaction, polymerization or cross-linking including that of the remaining ingredients take place subsequent to mixing and in the mold during the molding operation. After the cooling of the said reacted four ingredients the resulting solid is pulverized or granulated as desired.

Alternatively, the chlorinated plasticizer and the liquid epoxy resin may be mixed together and heated to approximately 150° centigrade and added to the anhydride hardener and the phenolic novolak resin heated separately to approximately 150° centigrade.

After the initial four ingredients have been prepared as indicated as described, listed in the table, are added in the amounts indicated and in the dry condition with the exception of the two accelerators and the silane filler treatment which are liquids and are added in as such. The material is then placed upon the rollers 27 and 28 and becomes the mass of material 35 as shown in FIG. 3 and as described in connection with the first example. For the second example, the roller 27 is maintained at a temperature of approximately 110° C. and the roller 28 is maintained at a temperature of approximately 27° C., in each case by appropriate heating and/or cooling means. Under the influence of the 110° C. temperature of the roller 27 the material 35 melts, that is, fluxes and becomes mixed together by virtue of the differential in speeds between the two rollers. In this example also, initially, the roller 27 has a peripheral speed of about 32 feet per minute and the roller 28 has a peripheral speed of about 25½ feet per minute. The milling continues until all of the material is in a fluxed or melted state at which time the peripheral speed of roller 27 is increased to 70 feet per minute and the roller 28 is increased to a peripheral speed of about 56 feet per minute as in the preceding example. The milling continues until the material which accumulates on the heated roller 27, when cooled and tested, in a molding operation performs according to the criterion, which is to form a product having the characteristics as already described including a molding time of less than one minute. Typically the milling time may be several minutes after complete, fluxing has been achieved. After the material accumulating on the roller 27 has the desired properties, that is the reaction or polymerization has gone on as far as it should, the layer of material 36 is peeled off through the use of the doctor blade 34 as previously described. The material peeled off falls upon the tray 31 and is rapidly cooled to room temperature by virtue of the cooling bed 32 of the rolling mill.

After cooling to room or other temperature, the sheet of material may be granulated or pulverized for use subsequently in the molding operation in the same manner as described for example number one.

In making semiconductor devices with the molding material of the second example the procedure followed is the same as that described in connection with the first example. The transistor 14, for example, is bonded to the flattened end 12 of one of the leads and the other two flattened ends of leads 11 and 13 are all disposed in a mold. Thereafter the molding material according to the second example is placed in the transfer pot 24 and is forced by the ram, schematically indicated by arrow 38, to flow into the cavity to form the encapsulated structure 19. One minute or less final curing time of the material in the mold is desirable. The temperature of the mold parts 10 and 22 is maintained at approximately 190° C. as in the case of the first example.

Actual devices, transistors, constructed in accordance with the second example molding compound show a beta retention of about 41 percent in the case of materials formed according to the invention whereas transistors formed with material not including the thioester and the antioxidant stabilizing materials had a beta retention of only about 22 percent after a high temperature reverse bias test.

In the second example the chlorinated plasticizer is an aromatic chlorine compound whereas the chlorendic anhydride of the first example is an aliphatic chlorine compound. Accordingly, the stabilization system of a thioester and an antioxidant works for both aliphatic as well as aromatic halogenated compounds. In the case of the second example, the chlorinated plasticizer is a non-reactive diluent needed in the formulation.

The silicone resin is a water resisting agent. The hexamethylene tetramine is a catalyst and the stannous octoate and the 2 ethyl, 4 methyl imidazole are accelerators. The silica or mineral filler is a filler and the lubricant may be montan wax or other suitable wax. The pigment may be carbon black, in the event black color is desired. Other suitable pigment may be used or none. The antimony oxide and the chlorinated plasticizer provide the halogenated compounds necessary for flame retardance and the thioester together with the antioxidant stabilize the halogen containing compounds in order that high temperature thermal stability of the resulting devices is obtained. The thioester and the antioxidant in the case of the second example may have the same variants as in the case of the first example.

It is understood by the man skilled in the art that any liquid epoxy resin may be substituted in the appropriate amount for the cycloaliphatic epoxy resin. Further, that any solid epoxy resin may be substituted in an appropriate amount for the epoxidized cresol novolak resin.

It is also understood that methods other than milling may be used to convert the raw ingredients into a usable molding compound as for example compaction or extrusion. Further the stabilization effect of the thioester antioxidant system is effective with the thermosetting resin systems other than the ones specifically disclosed.

Moreover other manners of forming such as potting, coating or casting are within the scope of the disclosure. Materials for these purposes may be either solids or liquids.

One form of silicone resin is that made by the Dow Corning Corporation and is available under the designation of Dow Corning Corporation R.5581. Other silicone resins may be used.

What is claimed is:

1. A composition for forming an epoxy and phenolic thermosetting thermally stabilized halogenated compound containing molding material comprising a mixture of equal percentage amounts of about 8.66 percent of a liquid epoxy resin having an epoxy equivalent weight of approximately 140 and a phenolic novolak resin; an epoxidized cresol novalak resin having an epoxy equivalent weight of about 225, of about 17.33 percent; a silica filler, of about 51.95 percent; montan wax, of about 1.03 percent; silicone resin, of about 1.59 percent; silane filler treatment, of about 0.18 percent; pigment, of about 0.19 percent; antimony oxide, of about 1.19 percent; chlorendic anhydride, of about 7.93 percent; stannous octoate, of about 0.10 percent, thioester, of about 0.40 percent; and an antioxidant, of about 0.79 percent.

2. The composition according to claim 1 wherein the liquid epoxy resin has the formula 3,4-epoxycyclohexyl-(3,4-epoxy) cyclohexane carboxylate.

3. The composition according to claim 2 wherein the silane filler treatment has the formula beta (3,4-epoxy-cyclohexyl) ethyltrimethoxysilane, the chlorendic anhydried has the formula 1,4,5,6,7,7 - hexachlorobicyclo-(2,2,1)-5-heptene-2,3-dicarboxylic anhydride, the stannous octoate is the stannous salt of 2 ethylhexanoic acid, the thioester is dilauryl thiodipropionate; and the antioxidant has the formula octadecyl 3-(3',5' di-tert-butyl-4'-hydroxyphenyl) propionate.

4. A composition for forming an epoxy and phenolic thermosetting thermally stabilized halogenated compound containing molding material comprising a mixture of a liquid epoxy resin having an epoxy equivalent weight of approximately 140, of about 7.50 percent; a phenolic novolak resin of about 7.50 percent; hexahydrophthalic anhydride, of about 6.77 percent; a chlorinated biphenyl, of about 3.37 percent; an epoxidized cresol novolak resin having an epoxy equivalent weight of about 225, of about 17.33 percent; a silica filler, of about 48.37 percent; montan wax, of about 0.52 percent; a silicone resin, of about 1.59 percent; a silane filler treatment, of about 0.18 percent; a pigment, of about 0.40 percent; antimony oxide, of about 4.76 percent; hexamethylene tetramine, of about 0.32 percent; a nitrogen; containing accelerator, of about 0.10 percent; stannous octoate, of about 0.10 percent, a thioester, of about 0.40 percent; and an antioxidant, about 0.79 percent.

5. The composition according to claim 4 wherein the liquid epoxy resin has the formula 3,4-epoxycyclohexyl-(3,4-epoxy) cyclohexane carboxylate.

6. The composition according to claim 5 wherein the silane filler treatment has the formula beta (3,4-epoxy-cyclohexyl) ethyltrimethoxysilane; the stannous octoate is the stannous salt of 2-ethylhexanoic acid, the thioester is dilauryl thiodipropionate; and the antioxidant has the formula octadecyl 3 - (3',5'-di-tert-butyl-4'-hydroxyphenyl) propionate.

7. The composition according to claim 6 wherein said nitrogen containing accelerator comprises 2 ethyl, 4 methyl imidazole.

References Cited
UNITED STATES PATENTS

| | | | |
|---|---|---|---|
| 3,382,204 | 5/1968 | Gouinlock | 260—33.8 EP UX |
| 3,418,263 | 12/1968 | Hindersinn et al. | 260—45.7 R U |
| 3,502,613 | 3/1970 | Berger | 260—45.9 D X |
| 3,285,855 | 11/1966 | Dexter et al. | 260—45.8 H X |

LEWIS T. JACOBS, Primary Examiner

U.S. Cl. X.R.

260—37 EP, 38 R, 831